United States Patent [19]

Suzuki et al.

[11] Patent Number: 5,071,294
[45] Date of Patent: Dec. 10, 1991

[54] BURNISHING DRILL

[75] Inventors: Yasuhiro Suzuki; Tuguo Yoshikawa; Kazuhiro Shibata; Akio Fukui; Kiyotaka Shiga, all of Aichi, Japan

[73] Assignees: Aisan Kogyo Kabushiki Kaisha; Fuji Seiko Limited, both of Aichi, Japan

[21] Appl. No.: 562,446

[22] Filed: Aug. 1, 1990

Related U.S. Application Data

[63] Continuation of Ser. No. 408,219, Sep. 18, 1989, abandoned.

[30] Foreign Application Priority Data

Jan. 24, 1989 [JP] Japan ............................ 1-6754

[51] Int. Cl.5 ............................................. B23B 51/02
[52] U.S. Cl. ................................... 408/145; 408/224; 408/227
[58] Field of Search ................ 408/145, 223, 224, 225, 408/227, 229, 230

[56] References Cited

U.S. PATENT DOCUMENTS

| Re. 16,817 | 12/1927 | Smith | 408/224 |
|---|---|---|---|
| 1,000,067 | 8/1911 | Bennett | 408/224 |
| 1,387,994 | 8/1921 | Lewis | 408/224 |
| 2,389,909 | 11/1945 | Hofbauer | 408/224 |
| 2,479,136 | 8/1949 | Schade | 408/223 |
| 4,671,710 | 6/1987 | Araki | 408/145 |
| 4,944,640 | 7/1990 | Suzuki et al. | |

FOREIGN PATENT DOCUMENTS

| 47119 | 3/1984 | Japan | 408/223 |
|---|---|---|---|
| 187421 | 10/1984 | Japan | 408/230 |
| 62-65107 | 4/1987 | Japan | . |
| 2094211 | 4/1987 | Japan | 408/145 |
| 62-72023 | 5/1987 | Japan | . |
| 1-117815 | 8/1989 | Japan | . |
| 1-117816 | 8/1989 | Japan | . |
| 1161273 | 6/1985 | U.S.S.R. | 408/224 |

Primary Examiner—Daniel W. Howell
Attorney, Agent, or Firm—Wenderoth, Lind & Ponack

[57] ABSTRACT

A burnishing drill includes a cylindrical drill body connected at its forward end integrally with a shank. The forward end of the drill body includes a first pair of cutting edges inclined radially and rearwardly from the forwardmost central end of the drill body toward the shank at a first cutting angle. A second pair of cutting edges formed of diamond chips are disposed in a plane intersecting the plane in which the first pair of cutting edges are located. The second pair of cutting edges are inclined radially and rearwardly from a position inside a circle including the maximum external margins of the first pair of cutting edges toward the shank at a second cutting angle.

6 Claims, 3 Drawing Sheets

BURNISHING DRILL

This application is a continuation of now abandoned application, Ser. No. 07/408,219 filed on Sept. 18, 1989.

BACKGROUND OF THE INVENTION

The present invention relates to a high-speed burnishing drill including a reamer section which has secondary cutting edges formed of diamond chips.

There are known various types of drilling tools that are adapted to ream a hole to a desired diameter while at the same time cutting the wall to form the hole. Such a drilling tool is a single-purposed, exclusive and/or automated tool which can be of increased cutting efficiency and used to provide high quality and uniform products.

Japanese Utility Model Laid-Open Application No. 62-65107 discloses a reamer section drill including two drilling edges and four reaming edges, all these edges being arranged in the same circle.

FIGS. 4 and 5 in the accompanying drawings show another known burnishing drill. Such a burnishing drill comprises a cylindrical drill body 2 connected with a shank 1. The drill body 2 has formed at a tip 3 thereof cutting edges 5 that are opposed to each other diametrically about the longitudinal axis of the drill body 2. Each of the cutting edges 5 has associated therewith an inclined or slant face 6 extending therefrom rearwardly with respect to the direction of rotation (shown by arrow A in FIG. 5) and a guide face 7 axially extending from the radially outer edge of the slant face 6. The drill body 2 further includes respective longitudinally extending relief surfaces 8 formed between each of the cutting edges 5 and the corresponding guide face 7 at the outer wall of the drill body 2 and longitudinally extending relief grooves 9 formed in the drill body 2.

This drill does not have good centering and stabilizing properties since the initial bite cannot be made properly. As a result, a hole drilled by such drill will be reamed excessively and its inner wall will be rough.

SUMMARY OF THE INVENTION

It is therefore an object of the present invention to provide an improved high-speed feed type burnishing drill having increased bit performance, thereby improving the centering and stabilizing properties thereof.

Another object of the present invention is to provide such an improved high-speed feed type burnishing drill which will not ream a drilled hole excessively and which can provide a drilled hole with a smoother inner wall.

To this end, the present invention provides a burnishing drill comprising a shank and a cylindrical drill body connected at one end of the shank. The opposite end of said drill body is formed with a reduced-diameter portion having an external diameter smaller than the maximum external diameter of the drill body. The reduced-diameter portion includes first cutting edge means extending radially outwardly from the center of the forward end thereof and inclining axially in the rearward direction at a first cutting angle. The reduced-diameter portion also includes second cutting edge means, formed of diamond chips, disposed in a plane intersecting the plane in which said first cutting edge means is located. The second cutting edge means extends radially outwardly from a position inwardly of the outermost peripheral position or wall of the first cutting edge means and is inclined axially in the rearward direction at a second cutting angle.

The second cutting edge means of the burnishing drill of the present invention may include two second cutting edges each having a respective diamond chip. The first cutting angle is in a range between 60° and 90°. The second cutting angle in a range between 30° and 90°.

The second cutting edge means formed of diamond chips is located on a circle having a radius larger than the radial dimension of the first cutting edge means. Therefore, drilling and reaming can be performed simultaneously to improve bite of the cutting edge means on the reduced-diameter portion of the drill the stability of cutting. During a drilling operation, the first cutting edge means on the reduced-diameter portion of the drill body first drills a hole in workpiece to be machined. The second cutting edge mans, formed of the diamond chips and having a greater hardness, reams the inner wall of the drilled hole to provide a smoother reamed hole with respect to the axis of the shank.

BRIEF DESCRIPTION OF THE DRAWINGS

Other objects, features and advantages of the present invention will be apparent from the following description, taken with the accompanying drawings, wherein.

DETAILED DESCRIPTION OF THE INVENTION

Figure 1:
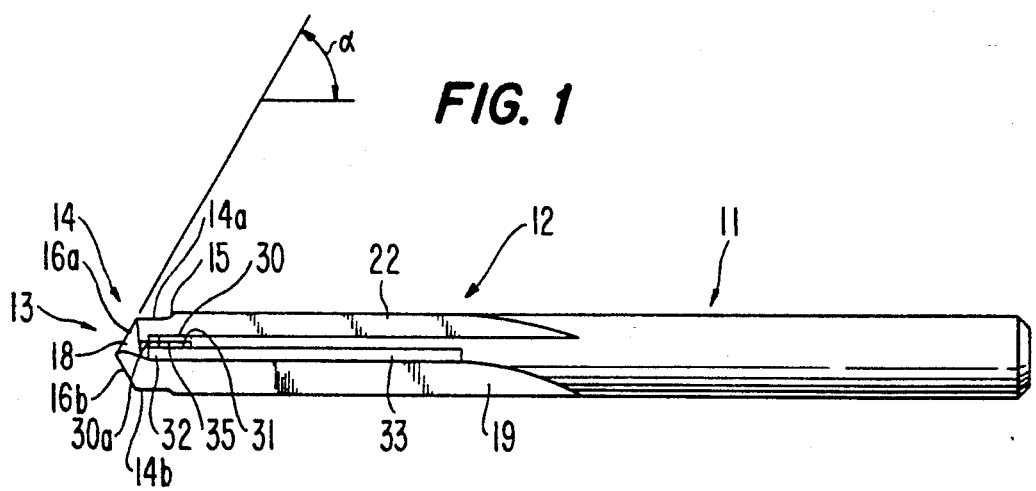
FIG. 1 is a side view of a burnishing drill constructed in accordance with one preferred embodiment of the present invention.
Figure 2:
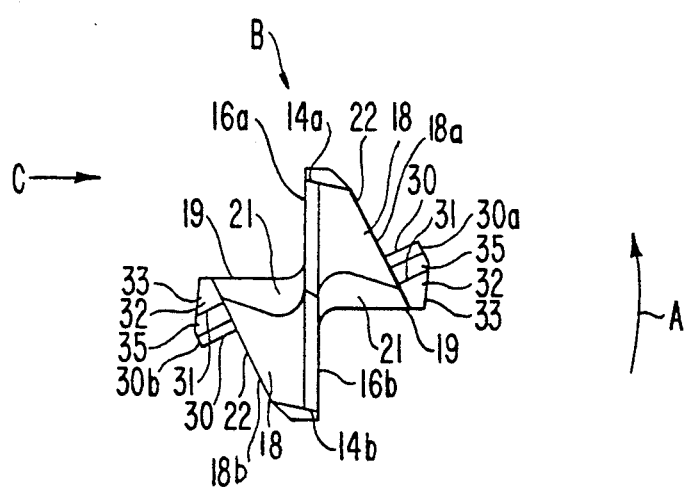
FIG. 2 is an enlarged front view of the burnishing drill shown in FIG. 1.

In FIGS. 1 to 3, a preferred embodiment of a burnishing drill constructed in accordance with the present invention is shown. The burnishing drill comprises a shank 11 and a cylindrical drill body 12 integrally connected therewith, both of which are made of a material such as WC (tungsten carbon). The forward end 13 of the drill body 12 includes a reduced-diameter portion 14 with an external diameter smaller than the maximum external diameter of the drill body 12. The reduced-diameter portion 14 is connected with the maximum diameter portion of the drill body 12 through a step portion 15.

The forwardmost end of the reduced-diameter portion 14 remote from the shank 11 includes a pair of first cutting edges 16a and 16b, each of which is inclined radially and rearwardly from the forwardmost end at a first cutting angle $\alpha$ with respect to the axis of the shank 11 and each of which is defined by a bevel surface shown in FIG. 2. Although the first cutting angle $\alpha$ is illustrated to be equal to 67.5°, it is desirable to set the first cutting angle $\alpha$ within a range of between 60° and 90°. The first cutting edges 16a and 16b have the outermost radial margins thereof connecting with corresponding guide faces 14a and 14b of the reduced-diameter portion 14. The first cutting edges 16a and 16b also are associated with inclined or slanted faces 18 extending from respective edges 16a and 16b radially and rearwardly toward the shank 11 in directions opposite to the rotational direction of cutting edges 16a and 16b (shown by arrow A in FIG. 2) and terminating in trailing edges 18a, 18b disposed respectively at angles converging radially outwardly relative to the cutting edges 16a and 16b.

A respective relief surface 22 extends axially from the outer peripheral margin of each of the faces 18 toward the shank 11. A respective relief portion 21 is formed in the root of each of the first cutting edges 16a and 16b, which root is located at a position nearer the shank than the forward center of the cutting edges 16a and 16b. Such relief portion 21 is connected with a respective relief groove 19 extending therefrom toward the shank 11.

The drill body 12 has therein a pair of flat plate-like diamond chips 30 located on opposite sides of the increased-diameter drill portion to extend in radial directions intersecting the radial directions of extension of the first cutting edges 16a and 16b, as shown in FIG. 2. It is desirable that diamond chips 30 be natural diamond chips since they have a hardness generally higher than that of artificial diamonds. However, the burnishing drill of the present invention can be used with either natural or artificial diamonds.

Each of the diamond chips 30 is mounted in a respective recessed groove 31 formed in the drill body 12 by and with a respective blade 35 that is, e.g., brazed into groove 31. Each recessed groove 31 is located in the drill body 12 rearwardly of the respective relief surface 22 with respect to the rotational direction A and opposite the respective relief groove 19. Each of the recessed grooves 31 is preferably formed in a respective support section 32 formed integrally with the shank 11. Each support section 32 has substantial circumferential thickness for strengthening purposes. A second relief face 33 extends axially toward the shank 11 and from the support section 32 in a direction rearwardly thereof with respect to the rotation direction A.

Figures 3A, 3B:
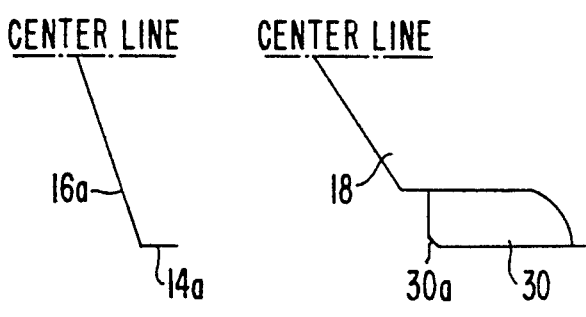
FIG. 3A is a schematic enlarged perspective view of primary portions of the drill shown in FIG. 2 as viewed in the direction of arrow B therein, to illustrate the orientation of a first cutting edge.
FIG. 3B is a view similar to FIG. 3A, but viewed in the direction of arrow C in FIG. 2 to illustrate a second cutting edge.
Figure 3C:
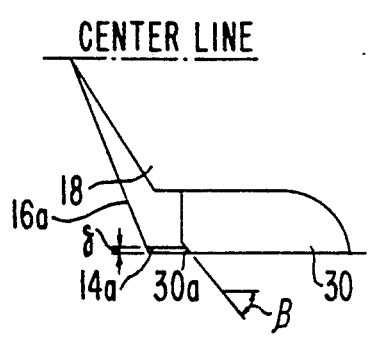
FIG. 3C is a schematic view superimposing the illustrations of FIGS. 3A and 3B to indicate the relative radial dimensions thereof.
Figure 4:
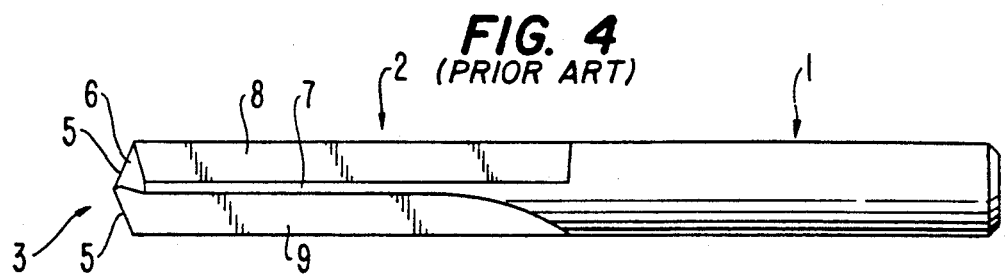
FIG. 4 is a side view of a burnishing drill constructed in accordance with the prior art.
Figure 5:
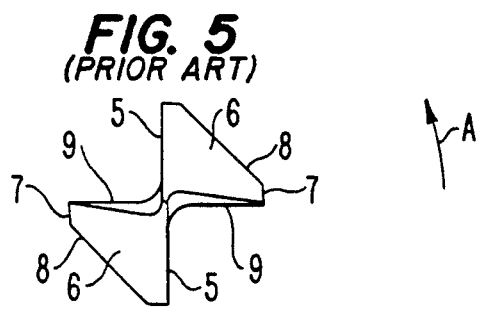
FIG. 5 is an enlarged front view of the prior art burnishing drill shown in FIG. 4.

As shown in FIGS. 3B and 3C, each of the diamond chips 30 includes a second cutting edge 30a, 30b inclined axially and rearwardly at a second cutting angle $\beta$. Although the second cutting angle $\beta$ is illustrated to be equal to 45°, it is preferred that the second cutting angle be within a range of between 30° and 90°. Each of the second cutting edges 30a and 30b extends radially outwardly from a position inwardly of the outermost periphery or outermost radial margins of the first cutting edges 16a and 16b, by a distance $\delta$. In such a manner, the inner wall of the drilled hole made by the first cutting edges 16a and 16b can be reamed more smoothly by the second cutting edges 30a and 30b to decrease the surface roughness of the reamed hole. The second cutting edges 30a and 30b can improve the initial biting action.

When the burnishing drill is rotated in the direction of arrow A as shown in FIG. 2, a workpiece is first drilled by the first cutting edges 16a and 16b. The drilled hole is further worked by the second cutting edges 30a and 30b to provide a reamed hole having a smoother inner wall. Since the rotational center of the first cutting edges 16a and 16b is coincident with that of the second cutting edges 30a and 30b, the concentricity upon drilling can be improved while at the same time stability of cutting can be increased greatly.

Figure 6:
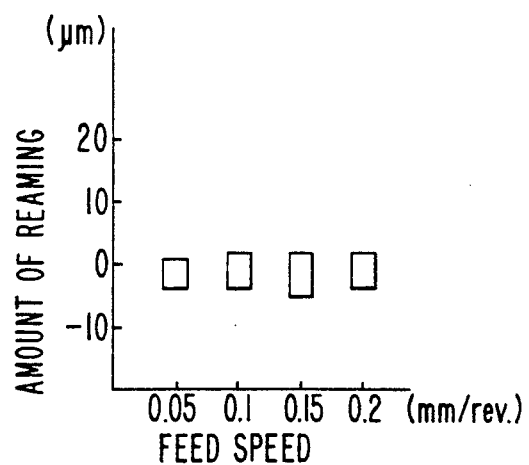
FIG. 6 is a graph showing the relationship between the feed speed of the cutting edge and the amount of increase of the hole diameter in accordance with the burnishing drill of the preferred embodiment of the present invention.
Figure 8:
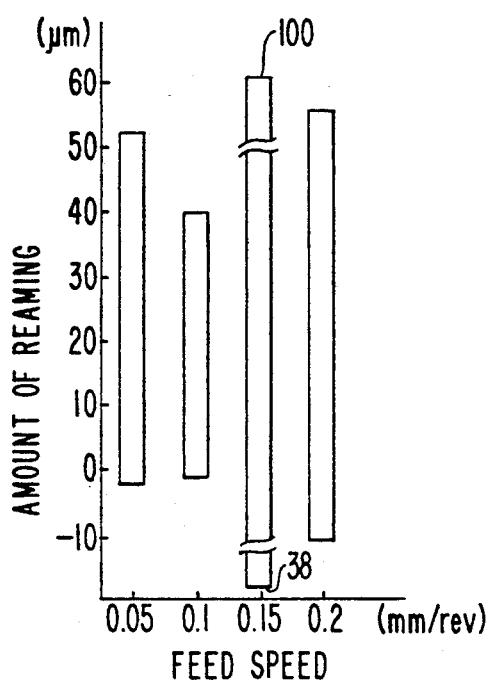
FIG. 8 is a graph similar to FIG. 6, illustrating the corresponding properties of the prior art burnishing drill.

In FIGS. 6 and 8, the value "0" of the amount of material to be removed indicates that the difference between the reference diameter of a hole to be drilled and the drilled and reamed hole diameter is equal to zero. As will be apparent when comparing FIGS. 6 with FIG. 8, the prior art drill provides that the diameter of the drilled hole becomes substantially larger than the designed reference hole diameter, regardless of the feed speed. In other words, the actual extent of increase of the hole size was greater than planned when the hole was reamed. The contrast, the drill of the present invention can provide that the amount of increase of the hole diameter over the designed diameter is substantially smaller than that of the prior art, regardless of the feed speed.

Figure 7:
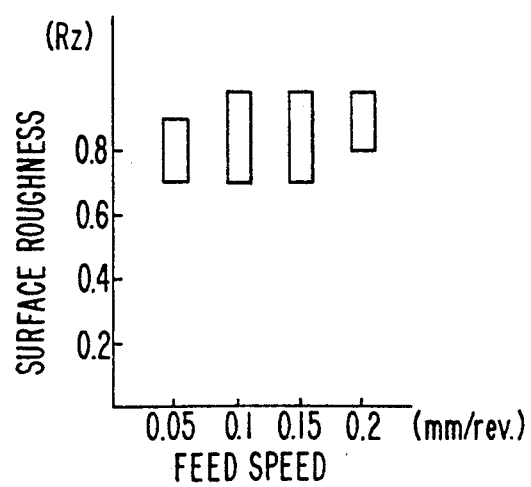
FIG. 7 is a graph showing the relationship between the feed speed of the cutting edge and the surface roughness of the hole drilled and reamed by the burnishing drill of the preferred embodiment of the present invention.
Figure 9:
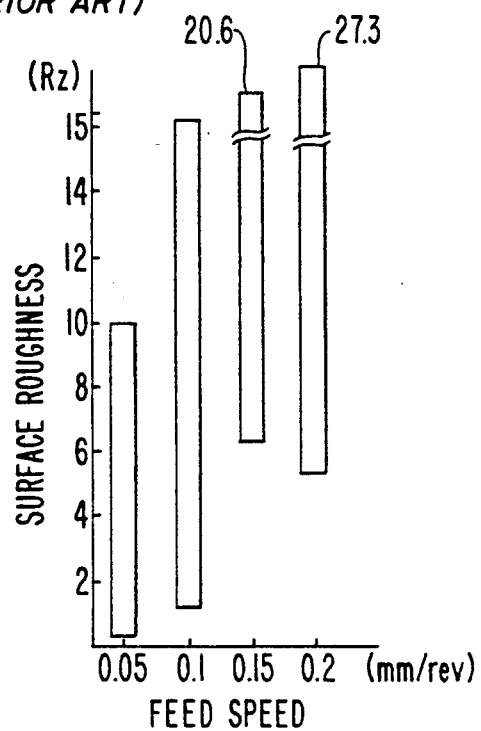
FIG. 9 is a graph similar to FIG. 7, illustrating the corresponding properties of the prior art burnishing drill.
Figure 10:
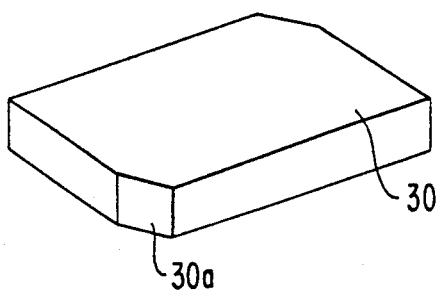
FIG. 10 is an enlarged perspective view of a diamond chip defining a second cutting edge.
Figure 11A:
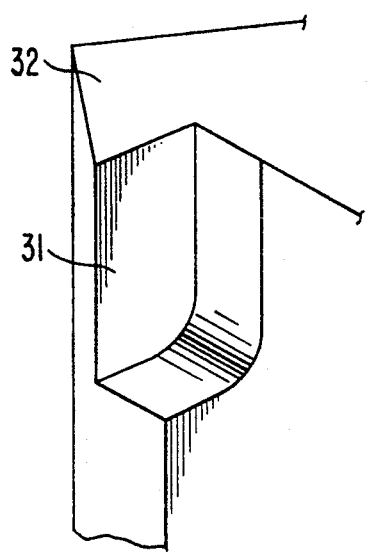
FIG. 11A is an enlarged perspective view illustrating a groove formed in a support section.
Figure 11B:
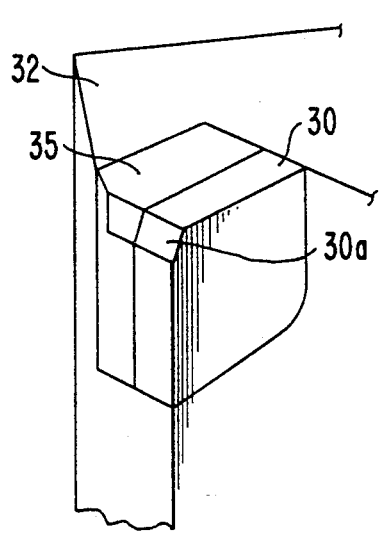
FIG. 11B is a view similar to FIG. 11A but illustrating a blade and a diamond chip inserted into the groove.

As will be apparent when comparing FIG. 7 with FIG. 9, the prior art burnishing drill provides a reamed hole with an inner wall whose surface is rough and irregular at increasing levels as the feed speed is increased. In contrast, the burnishing drill of the present invention provides a reamed hole with an inner wall whose surface is less rough. The maximum surface roughness remains very small, thus providing a smoother inner wall of the drilled and reamed hole, even when the feed speed is increased.

As will be apparent from the foregoing, the high-speed burnishing drill constructed according to the present invention comprises first and second cutting edge means on the forward end of the drill body. The inner wall of the hole drilled by the first cutting edge means is further smoothed by the second cutting edge means made of diamond chips having increased hardness. Since the first and second cutting edge means are formed concentrically on a single drill body, the burnishing drill of the present invention can form a hole having an inner wall with an improved smoothness. Further, a drilled and reamed hole can be formed in a reduced time period with increased accuracy, since both the drilling and reaming operations are carried out in a single process.

Since the outermost peripheral margins of the first and second cutting edge means are positioned axially adjacent each other, the first cutting edge means can drill, along the same central axis, a hole having a minimum difference between the internal diameter of the drilled hole and the internal diameter of the hole to be reamed by the second cutting edge means. In addition, the amount of material to be removed after the initial drilling and the surface roughness of the finished hole can be maintained minimum even if the feed speed is increased within a predetermined range of speed.

While the invention has been described in connection with what is presently considered to be the most practical and preferred embodiment, it is to be understood that the invention is not limited to the disclosed embodiment, but on the contrary is intended to cover various modifications and equivalent arrangements included within the spirit and scope of the appended claims.

We claim:

1. A burnishing drill, comprising:
    a shank;
    a cylindrical drill body having a first end connected with said shank and an opposite second end having an external diameter smaller than the maximum external diameter of said drill body;
    a first pair of cutting edges for boring a new hole in a workpiece on said second end, said pair of cutting edges extending from a common apex on the longitudinal axis of said drill, radially outwardly with respect to said second end, to said external diameter of said second end and extending longitudinally rearward in the direction of said first end to define a first cutting angle of said first pair of cutting edges relative to the longitudinal axis of said drill; and
    a second pair of cutting edges for reaming the hole bored by said first pair of cutting edges on said cylindrical drill body disposed in a plane intersecting the planes of said first cutting edges;
    wherein each said first cutting edge has a guide face extending rearwardly from its outermost radial margin and each said guide face has a step portion associated therewith extending from said guide face to said maximum external diameter of said drill body.

2. A burnishing drill, comprising:
    a shank;
    a cylindrical drill body having a first end connected with said shank and an opposite second end having an external diameter smaller than the maximum external diameter of said drill body;
    a first pair of cutting edges for boring a new hole in a workpiece on said second end, said pair of cutting edges extending from a common apex on the longitudinal axis of said drill, radially outwardly with respect to said second end, to said external diameter of said second end and extending longitudinally rearward in the direction of said first end to define a first cutting angle of said first pair of cutting edges relative to the longitudinal axis of said drill; and
    a second pair of cutting edges for reaming the hole bored by said first pair of cutting edges on said cylindrical drill body disposed in a plane intersecting the planes of said first cutting edges;
    wherein each said first cutting edge has a slant face extending radially and rearwardly therefrom toward said shank, and each said slant face has a planar relief surface extending longitudinally rearwardly therefrom in the direction of said shank.

3. The burnishing drill as set forth in claim 2, wherein each said first cutting edge further has a relief portion and a relief groove associated therewith, each said relief portion extending radially outwardly from said apex adjacent a respective said slant face, and each said relief groove extending from a respective said relief portion longitudinally rearwardly in the direction of said shank.

4. The burnishing drill as set forth in claim 2, wherein said second pair of cutting edges comprises a support section adjacent each said planar relief surface, a recessed groove formed in each said support section, and means defining a cutting portion disposed in each said recessed groove.

5. The burnishing drill as set forth in claim 4, wherein:
    said means defining a cutting portion comprises a diamond chip; and
    a blade is disposed in each said support section adjacent said diamond chip.

6. A burnishing drill, comprising:
    a shank;
    a cylindrical drill body having a first end connected with said shank and an opposite second end having an external diameter smaller than the maximum external diameter of said drill body;
    a first pair of cutting edges for boring a new hole in a workpiece on said second end, said pair of cutting edges extending from a common apex on the longitudinal axis of said drill, radially outwardly with respect to said second end, to said external diameter of said second end and extending longitudinally rearward in the direction of said first end to define a first cutting angle of said first pair of cutting edges relative to the longitudinal axis of said drill; and
    a second pair of cutting edges for reaming the hole bored by said first pair of cutting edges on said cylindrical drill body disposed in a plane intersecting the planes of said first cutting edges;
    wherein each said first cutting edge has a guide face extending rearwardly from its outermost radial margins;
    wherein each said guide face has a step portion associated therewith extending from said guide face to said maximum external diameter of said frill body; and
    wherein said second pair of cutting edges are disposed, with respect to the longitudinal direction of said shank and said cylindrical drill body, between said step portions and said first pair of cutting edges.

* * * * *